Feb. 1, 1944.    H. I. HAZZARD    2,340,662

PISTON

Filed Nov. 14, 1941

Inventor
Harry I. Hazzard

Patented Feb. 1, 1944

2,340,662

UNITED STATES PATENT OFFICE 2,340,662

PISTON

Harry I. Hazzard, Milwaukee, Wis., assignor to Briggs & Stratton Corporation, Milwaukee, Wis., a corporation of Delaware Application November 14, 1941, Serial No. 419,055

1 Claim. (Cl. 309—14)

This invention relates to pistons and refers particularly to a piston construction shown in the copending application of Oscar F. Gottlieb, Serial No. 419,054, filed November 14, 1941.

The piston of the aforesaid Gottlieb application is characterized by the fact that it employs a cast iron head and a thin steel skirt brazed to the ring flange of the head.

It has been found that if the brazed junction between the head and skirt is so located as to be exposed to the cylindrical surface of the finished piston, the copper or other spelter employed is apt to be dragged out onto the cylinder and piston walls which, of course, is undesirable.

It is, therefore, the object of this invention to so construct the parts that the brazed junction between the head and skirt has no part thereof exposed on the cylindrical surface of the finished piston.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof, and in which.

Figure 1:
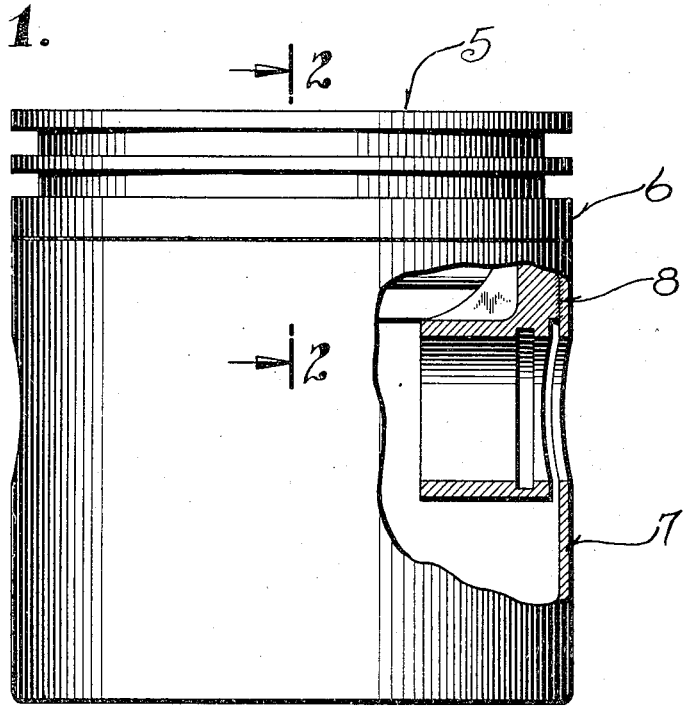
Figure 1 is a side elevational view of a piston constructed in accordance with this invention but showing the same in its condition before the lowermost ring groove is cut or machined.
Figure 2:
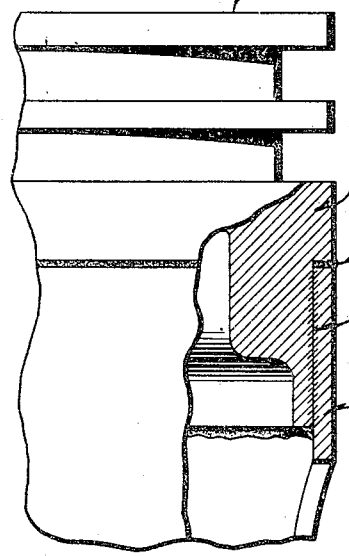
Figure 2 is an enlarged detail view partly in section and partly in elevation with its sectional portion on the plane of the line 2—2 in Figure 1 and also showing the piston in its condition prior to the cutting of the lowest ring groove.
Figure 3:
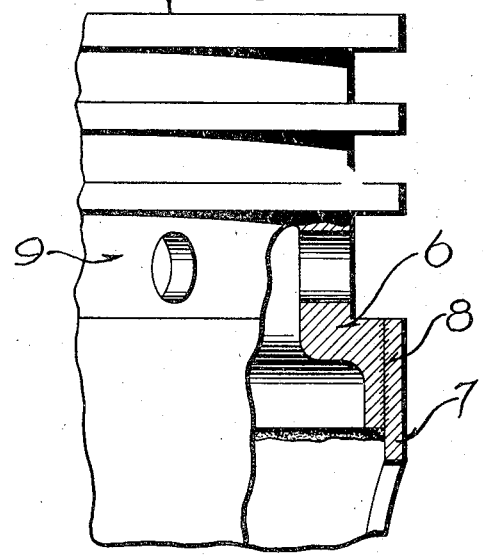
Figure 3 is a view similar to Figure 2 but showing the piston in its finished condition.

Referring now particularly to the accompanying drawing, in which like numerals indicate like parts, the numeral 5 designates the head of a piston which, as noted hereinbefore, is cast and has a depending ring flange 6 to which a skirt 7 is brazed.

The head is preferably cast of iron and the skirt is formed of steel in any desired manner.

At its lower outer edge, the ring flange has a step 8 cut therein onto which the skirt 7 is telescoped, and as in the aforesaid application of Oscar F. Gottlieb, the skirt is joined to the head by brazing or its equivalent, but it is to be observed that the junction between the skirt and the top of the step 8 in the ring flange is located at the point where the lowermost ring groove 9 is to be machined.

Thus, in machining this groove, the portion of the brazed junction indicated by the numeral 10 and which was exposed to the cylindrical surface of the piston is entirely cut away so that in the finished piston no part of the brazed junction is exposed to the cylindrical surface. Hence, there is no danger of having the spelter dragged out onto the surfaces of the cylinder and piston. This method of making the piston forms the subject matter of a copending continuing application, Serial No. 474,975, filed February 6, 1943.

What I claim as my invention is:

A piston of the character described comprising: a cast head having its lower end portion reduced in diameter and having at least one annular piston ring groove therein, one side wall of which defines the upper limit of said reduced lower end portion; and a skirt for the piston telescoped over the reduced lower end portion of the head and fused thereto, the uppermost edge of the skirt terminating flush with the side wall of said annular groove which defines the uppermost extremity of the reduced portion of the head, to form an extension of said side wall outwardly of the joint between the reduced portion and the skirt, and so that the exposed junction between the head and skirt faces the other side wall of said annular groove, whereby no part of the fused junction is exposed to possible contact with the cylinder in which the piston operates.

HARRY I. HAZZARD.